(12) United States Patent
Wheat et al.

(10) Patent No.: US 7,858,245 B2
(45) Date of Patent: Dec. 28, 2010

(54) METHODS OF USING INTEGRATED FUEL PROCESSOR APPARATUS AND ENCLOSURE

(75) Inventors: William Spencer Wheat, Missouri City, TX (US); Kenneth Joseph Bunk, Millersville, MD (US); Ralph Stanley Worsley, Brentwood Bay (CA)

(73) Assignee: Texaco Inc., San Ramon, CA (US)

( * ) Notice: Subject to any disclaimer, the term of this patent is extended or adjusted under 35 U.S.C. 154(b) by 0 days.

(21) Appl. No.: 11/445,701

(22) Filed: Jun. 2, 2006

(65) Prior Publication Data

US 2006/0219643 A1 Oct. 5, 2006

Related U.S. Application Data

(62) Division of application No. 10/407,876, filed on Apr. 4, 2003.

(51) Int. Cl.
*H01M 8/16* (2006.01)
*C01B 3/36* (2006.01)

(52) U.S. Cl. ..................... 429/408; 48/197 R
(58) Field of Classification Search ................. 429/12, 429/34, 40, 408; 48/197 R
See application file for complete search history.

(56) References Cited

U.S. PATENT DOCUMENTS

| | | | |
|---|---|---|---|
| 4,855,192 A | 8/1989 | Grasso | |
| 4,973,529 A | 11/1990 | Grasso et al. | |
| 5,366,818 A | 11/1994 | Wilkinson et al. | |
| 5,643,470 A | 7/1997 | Amini | |
| 5,980,726 A | 11/1999 | Moulthrop, Jr. et al. | |
| 6,077,620 A | 6/2000 | Pettit | |
| 6,232,005 B1 | 5/2001 | Pettit | |
| 6,342,197 B1 | 1/2002 | Senetar et al. | |
| 6,485,854 B1 | 11/2002 | Grover et al. | |
| 6,566,631 B2 | 5/2003 | Faries, Jr. et al. | |
| 6,610,431 B1 | 8/2003 | Walsh et al. | |
| 6,759,154 B2 | 7/2004 | O'Brien et al. | |
| 6,824,577 B2 | 11/2004 | Deshpande | |
| 6,835,481 B2 * | 12/2004 | Dickman et al. ............ 429/19 |
| 6,887,285 B2 | 5/2005 | Deshpande | |
| 7,022,149 B2 | 4/2006 | Krause et al. | |
| 7,026,065 B2 | 4/2006 | Ballantine et al. | |
| 7,041,411 B2 | 5/2006 | Walsh | |
| 7,052,790 B2 * | 5/2006 | Nakamura et al. ........... 429/26 |
| 2002/0025463 A1 | 2/2002 | Derflinger et al. | |

(Continued)

FOREIGN PATENT DOCUMENTS

EP 0959512 11/1999

(Continued)

*Primary Examiner*—Patrick Ryan
*Assistant Examiner*—Thomas H. Parsons
(74) *Attorney, Agent, or Firm*—Melissa Patangia; Frank C. Turner

(57) ABSTRACT

An integrated fuel processor apparatus and enclosure for converting hydrocarbon fuel to a hydrogen rich gas. The integrated apparatus includes a fuel processor for producing a hydrogen-rich reformate that contains water and a combustible gas component. The fuel processor is enclosed in a gas impermeable enclosure that has a collection vessel for receiving water separated from the reformate stream. Methods for manufacturing an apparatus for separating water from a reformate stream for safe disposal and methods for separating water from a reformate stream for safe disposal are disclosed.

14 Claims, 2 Drawing Sheets

U.S. PATENT DOCUMENTS

| | | |
|---|---|---|
| 2002/0083646 A1 | 7/2002 | Deshpande et al. |
| 2002/0090326 A1 | 7/2002 | Deshpande |
| 2002/0094310 A1 | 7/2002 | Krause et al. |
| 2002/0155329 A1 | 10/2002 | Stevens |
| 2003/0021742 A1 | 1/2003 | Krause et al. |
| 2003/0022050 A1 | 1/2003 | Barton et al. |
| 2003/0056652 A1 | 3/2003 | Edlund et al. |
| 2004/0099045 A1 | 5/2004 | Demarest et al. |
| 2004/0166381 A1 | 8/2004 | Muramoto |

FOREIGN PATENT DOCUMENTS

| | | |
|---|---|---|
| EP | 0977293 | 2/2000 |
| WO | WO 94/02409 | 2/1994 |
| WO | WO 01/59861 | 8/2001 |

* cited by examiner

METHODS OF USING INTEGRATED FUEL PROCESSOR APPARATUS AND ENCLOSURE

The present invention is a divisional application of U.S. application Ser. No. 10/407,876, filed Apr. 4, 2003, the complete disclosure of which is incorporated herein by reference.

FIELD OF THE INVENTION

The present invention relates to methods of using a fuel processing apparatus for converting hydrocarbon-based fuels into a hydrogen-enriched reformate for use by fuel cells or other devices requiring such hydrogen feed streams. The methods of the present invention provide for the safe operation of fuel processor and safe disposal of waste streams from the fuel processor or from an integrated fuel processor-fuel cell stack.

BACKGROUND OF THE INVENTION

Fuel cells provide electricity from chemical oxidation-reduction reactions and possess significant advantages over other forms of power generation in terms of cleanliness and efficiency. Typically, fuel cells employ hydrogen as the fuel and oxygen as the oxidizing agent. The power generation is proportional to the consumption rate of the reactants.

A significant disadvantage which inhibits the wider use of fuel cells is the lack of a widespread hydrogen infrastructure. Hydrogen has a relatively low volumetric energy density and is more difficult to store and transport than the hydrocarbon fuels currently used in most power generation systems. One way to overcome this difficulty is the use of reformers to convert the hydrocarbons to a hydrogen rich gas stream which can be used as a feed for fuel cells.

Hydrocarbon-based fuels, such as natural gas, LPG, gasoline, and diesel, require conversion processes to be used as fuel sources for most fuel cells. Current art uses multi-step processes combining an initial conversion process with several clean-up processes. The initial process is most often steam reforming (SR), autothermal reforming (ATR), catalytic partial oxidation (CPOX), or non-catalytic partial oxidation (POX). The clean-up processes are usually comprised of a combination of desulphurization, high temperature water-gas shift, low temperature water-gas shift, selective CO oxidation, or selective CO methanation. Alternative processes include hydrogen selective membrane reactors and filters.

The hydrogen-rich reformate produced in such conversion or reforming processed typically contain moderate to high levels of water in the form of steam. Although most types of fuel cells require a certain level of humidity to operate efficiently, the presence of excess water can flood the fuel cell and severely inhibit the electrochemical reaction. Furthermore, water removed from the hydrogen-gas reformate can contain unacceptable levels of combustible gases. Thus, water separated from a hydrogen-rich reformate stream cannot simply be routed to a domestic drain or sewage system.

In addition, there is a need to ensure the safe operation of a fuel processing systems so that the failure of any of the fuel processing subsystems does not result in an immediate release of combustible gases or other potentially hazardous materials to the local environment. Thus, there remains a need for a simple unit for converting a hydrocarbon-based fuel to a hydrogen-rich gas reformate for use in conjunction with a fuel cell, that is capable of removing and safely disposing of water separated from a hydrogen-rich reformate as well as other materials that may be present in an integrated fuel processing-fuel cell system.

SUMMARY OF THE INVENTION

The present disclosure is generally directed to an integrated fuel processor apparatus and enclosure for converting hydrocarbon fuel to a hydrogen rich gas. In one such illustrated embodiment, the integrated apparatus includes a fuel processor for producing a hydrogen-rich reformate that contains water and a combustible gas component. The fuel processor is enclosed in a gas impermeable enclosure. Also within the enclosure is a collection vessel for receiving the water. The collection vessel has a drain for directing the water out of the enclosure and is preferably open to the interior of the enclosure so that any combustible gas component that is entrained in the water can evaporate to the interior of the enclosure. Optionally, the enclosure has a ventilator for evacuating the combustible gas component from within the enclosure. Optionally, the ventilator may be configured to direct the evacuated combustible gas components to a combustor for disposal through combustion. A gas detection sensor is included in the enclosure to monitor the interior of the enclosure for the presence of any combustible gases. A processor can be provided for receiving data from the sensor and generating a signal when combustible gases are detected. The apparatus can further include a separator for separating the water from the hydrogen-rich reformate, the separated water being directed to the collection vessel. The fuel processor optionally may comprise a combustor for receiving and combusting the water-depleted reformate. Optionally, but highly preferred, the integrated apparatus can have a connection for receiving a fuel cell exhaust mixture comprising an exhaust gas and product water from a fuel cell stack. When such a connection is present, it is preferred that the apparatus include a separator in fluid communication with the connection for separating the product water from the exhaust gas. Again, separated product water is directed to the collection vessel while the separated exhaust gas is routed to and combusted in a combustor. Optionally, the integrated apparatus can include a process water tank that has an outlet for withdrawing process water from the tank. Preferably this outlet is connected with the collection vessel for directing withdrawn process water to the collection vessel.

The present disclosure also encompasses a method for separating water from a reformate stream for safe disposal. The method comprises the steps of operating a fuel processor within a gas impermeable enclosure to produce a hydrogen-rich reformate including water and at least one combustible gas component, separating the water from the hydrogen-rich reformate and directing the water to an open collection vessel within the enclosure, and evaporating an entrained combustible gas component(s) from the water to the interior of the enclosure. Optionally, but highly preferred, this method further includes the step of directing the water out of the collection vessel to a drain. The method can also include the step of combusting the water-depleted hydrogen-rich reformate. The method can further include a step of detecting the presence of a combustible gas component within the interior of the enclosure and generating a signal when a combustible gas component is detected. Further, the method can include the step of evacuating a combustible gas component from the interior of the enclosure and preferably combusting the evacuated combustible gas component. In addition, the method can include the steps of receiving from a fuel cell a fuel cell exhaust mixture that contains an exhaust gas and product water. Such a method would preferably include the steps of separating the product water from the exhaust gas, directing the product water to the open collection vessel and combusting the separated exhaust gas. The present method can further include the step of withdrawing process water from a process water tank and directing the withdrawn process water to the open collection vessel for disposal Another illustrative method of the present invention is a method for manufacturing an apparatus for separating water from a reformate stream for safe disposal. The method comprises the steps of enclosing a fuel processor, which will be used to produce a hydrogen-rich reformate comprising water and at least one combustible gas component, in a gas impermeable enclosure, providing a separator for separating the water from the hydrogen-rich reformate, providing an open collection vessel within the gas impermeable enclosure for receiving separated water from the separator, and providing the collection vessel with a drain connection. Optionally, but preferably, the method will also include the step of providing a gas detection sensor in the enclosure for detecting the presence of a combustible gas component within the interior of the enclosure. Further, the method can include the step of providing a connection to a fuel cell for receiving fuel cell exhaust that contains water and a fuel cell exhaust gas from a fuel cell.

BRIEF DESCRIPTION OF THE DRAWINGS

The invention may be understood by reference to the following description taken in conjunction with the accompanying drawings.

Figure 1:
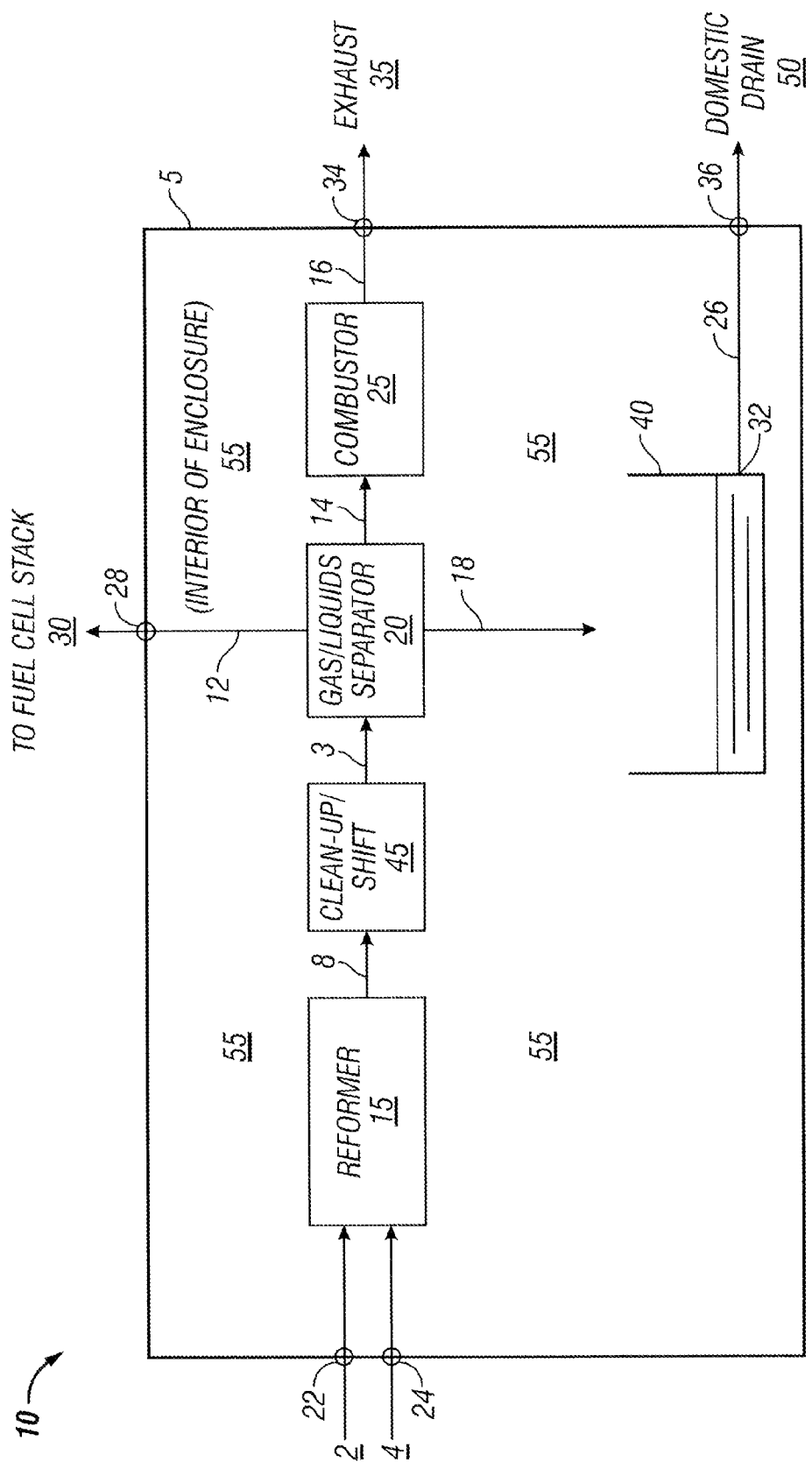
FIG. 1 is a block diagram of an integrated fuel processor apparatus and enclosure of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE PREFERRED EMBODIMENTS

Illustrative embodiments of the invention are described below. In the interest of clarity, not all features of an actual embodiment are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover it will be appreciated that such a development effort might be complex and time-consuming, but would nevertheless be a routing undertaking for those of ordinary skill in the art having the benefit of this disclosure.

The present invention utilizes a central collection vessel that is open to the inside of the enclosure and a gas detection sensor to monitor that enclosure. The function of the collection vessel is to prevent any combustible gasses that may have been entrained in liquid collected in the water separation process from passing through the primary drain of the reforming system. The function of the gas detection sensor is to monitor the interior of the cabinet for the presence of combustible gases. The system includes a ventilation design that will prevent any build up of combustible gases. Therefore, the present invention provides (1) an integrated fuel processor apparatus and enclosure, (2) a method for separating water from a reformate stream for sage disposal, and (3) a method for manufacturing an apparatus for separating water from a reformate stream for safe disposal.

(1) An Integrated Fuel Processor Apparatus and Enclosure

The integrated apparatus of the present invention includes a fuel processor for producing a hydrogen-rich reformate comprising water and a combustible gas component, an enclosure for containing the fuel processor, and a collection vessel within the enclosure for receiving the water, the collection vessel having a drain for directing the water out of the enclosure.

Fuel Processor

Fuel reformers or processors are well known in the art for use in reforming or converting a hydrocarbon-based stream to a hydrogen-rich gas stream. Two different reactions are typically carried out in the reforming process. Formulas I and II are exemplary reaction formulas wherein methane is considered as the hydrocarbon:

$$CH_4 + \tfrac{1}{2}O_2 \Rightarrow 2H_2 + CO \qquad (I)$$

$$CH_4 + H_2O \Rightarrow 3H_2 + CO \qquad (II)$$

The partial oxidation reaction (formula I) occurs very quickly to the complete conversion of oxygen added and is exothermic (i.e., produces heat). A higher concentration of oxygen in the feed stream favors the partial oxidation reaction.

The steam reforming reaction (formula II), occurs slower and is endothermic (i.e., consumes heat). A higher concentration of water vapor favors steam reforming.

One of skill in the art should understand and appreciate that partial oxidation and steam reforming may be combined to convert pre-heated reformer reactants into a synthesis gas containing hydrogen and carbon monoxide. In such instances, the ratios of oxygen to hydrocarbon and water to hydrocarbon become characterizing parameters. These ratios affect the operating temperature and hydrogen yield. The operating temperature of the reforming step can range from about 550° C. to about 900° C., depending on the feed conditions and the catalyst.

The reformer uses a catalyst bed that may be in any form including pellets, spheres, extrudate, monoliths, and the like or wash coated onto the surface of fins or heat pipes. Partial oxidation catalysts should be well known to those with skill in the art and are often comprised of noble metals such as platinum, palladium, rhodium, and/or ruthenium on an alumina wash coat on a monolith, extrudate, pellet or other support. Non-noble metals such as nickel or cobalt have been used. Other wash coats such as titania, zirconia, silica, and magnesia have been cited in the literature. Many additional materials such as lanthanum, cerium, and potassium have been cited in the literature as "promoters" that improve the performance of the partial oxidation catalyst. Steam reforming catalysts should be known to those with skill in the art and can include nickel with amounts of cobalt or a noble metal such as platinum, palladium, rhodium, ruthenium, and/or iridium. The catalyst can be supported, for example, on magnesia, alumina, silica, zirconia, or magnesium aluminate, singly or in combination. Alternatively, the steam reforming catalyst can include nickel, preferably supported on magnesia, alumina, silica, zirconia, or magnesium aluminate, singly or in combination, promoted by an alkali metal such as potassium.

When the reforming process is primarily an autothermal reforming process, a cooling step is used to cool the reformate stream to a temperature of from about 600° C. to about 200° C., preferably from about 500° C. to about 300° C., and more preferably from about 425° C. to about 375° C., in preparation for various clean-up processes. This cooling may be achieved with heat sinks, heat pipes or heat exchangers depending upon the design specifications and the need to recover/recycle the heat content of the gas stream. Alternatively, or in addition thereto, cooling may be accomplished by injecting additional feed components such as fuel, air or water. Water is preferred because of its ability to absorb a large amount of heat as it is vaporized to steam. The amounts of added components depend upon the degree of cooling desired and are readily determined by those with skill in the art. When the reforming process is intended to be primarily a steam reforming process, cooling of the synthesis gas is optional because of the endothermic nature of the steam reforming process.

A common impurity in the raw reformate stream is sulfur, which is converted by the reforming process to hydrogen sulfide. The reformer or a module downstream from the reformer can preferably include zinc oxide and/or other materials capable of absorbing and converting hydrogen sulfide, and may include a support (e.g., monolith, extrudate, pellet etc.). Desulphurization is accomplished by converting the hydrogen sulfide to water in accordance with the following reaction formula III:

$$H_2S + ZnO \Rightarrow H_2O + ZnS \qquad (III)$$

Zinc oxide is preferred as it is an effective hydrogen sulfide absorbent over a wide range of temperatures from about 25° C. to about 700° C. and affords great flexibility for optimizing the sequence of processing steps by appropriate selection of operating temperature. Other impurities such as chlorides can also be removed.

The purified reformate stream may then be sent to an optional mixing step in which water is added to the gas stream. The addition of water lowers the temperature of the reactant stream as it vaporizes and supplies more water for the water gas shift reaction. The water vapor and other reformate stream components can be mixed by being passed through a processing core of inert materials such as ceramic beads or other similar materials that effectively mix and/or assist in the vaporization of the water. A typical water gas shift reaction converts carbon monoxide to carbon dioxide in accordance with formula IV:

$$H_2O + CO \Rightarrow H_2 + CO_2 \qquad (IV)$$

In this process step, carbon monoxide, a poison to fuel cells, is substantially removed from the gas stream and is converted into carbon dioxide, which is generally considered an inert gas in fuel cells. The concentration of carbon monoxide should preferably be lowered to a level that can be tolerated by fuel cells, typically below about 50 ppm. Generally, the water gas shift reaction can take place at temperatures of from 150° C. to 600° C. depending on the catalyst used. Under such conditions, most of the carbon monoxide in the gas stream is oxidized to carbon dioxide.

Low temperature shift catalysts operate at a range of from about 150° C. to about 300° C. and include for example, copper oxide, or copper supported on other transition metal oxides such as zirconia, zinc supported on transition metal oxides or refractory supports such as silica, alumina, zirconia, etc., or a noble metal such as platinum, rhenium, palladium, rhodium or gold on a suitable support such as silica, alumina, zirconia, and the like. High temperature shift catalysts are preferably operated at temperatures ranging from about 300° C. to about 600° C. and can include transition metal oxides such as ferric oxide or chromic oxide, and optionally including a promoter such as copper or iron silicide. Other suitable high temperature shift catalysts are supported noble metals such as supported platinum, palladium and/or other platinum group members. The shift catalyst can also include a packed bed of high temperature or low temperature shift catalyst such as described above, or a combination of both high temperature and low temperature shift catalysts. Optionally, an element such as a heat pipe may be disposed in the processing core of the shift reactor to control the reaction temperature within the packed bed of catalyst as lower temperatures are favorable to the conversion of carbon monoxide to carbon dioxide.

In addition, selective oxidation can optionally be performed on the hydrogen-rich reformate to convert remaining carbon monoxide to carbon dioxide. Such reactions include: the desired oxidation of carbon monoxide (formula V) and the undesired oxidation of hydrogen (formula VI) as follows:

$$CO + \tfrac{1}{2}O_2 \Rightarrow CO_2 \qquad (V)$$

$$H_2 + \tfrac{1}{2}O_2 \Rightarrow H_2O \qquad (VI)$$

The processing is carried out in the presence of a catalyst for the oxidation of carbon monoxide and may be in any suitable form, such as pellets, spheres, monolith, etc. Oxidation catalysts for carbon monoxide are known and typically include noble metals (e.g., platinum, palladium) and/or transition metals (e.g., iron, chromium, manganese), and/or compounds of noble or transition metals, particularly oxides. A preferred oxidation catalyst is platinum on an alumina wash coat. The wash coat may be applied to a monolith, extrudate, pellet or other support. Additional materials such as cerium or lanthanum may be added to improve performance. Many other formulations have been cited in the literature with some practitioners claiming superior performance from rhodium on alumina catalysts. Ruthenium, palladium, gold, and other materials have been cited in the literature as being active for this use as well.

The preferential oxidation of carbon monoxide is favored by low temperatures. Because both reactions produce heat, a heat pipe or other means can be disposed within the reactor to remove heat generated in the process. The operating temperature of process is preferably kept in the range of from about 90° C. to about 150° C. Again, such an oxidation process can be utilized to reduce the carbon monoxide level to less than 50 ppm, a level that is suitable for use in fuel cells.

The hydrogen-rich reformate exiting the fuel processor is a hydrogen rich gas containing carbon dioxide and other constituents such as water, inert components (e.g., nitrogen, argon), residual hydrocarbon, etc. This reformate can be used as the feed for a fuel cell or for other applications where a hydrogen-rich feed stream is desired. Optionally, the hydrogen-rich reformate may be sent on to further processing, for example, to remove carbon dioxide, water or other components. The separation of water from the reformate stream before passage to the fuel cell stack is addressed below.

Suitable reformers include but are not limited to those described in U.S. Patent Application Publication Nos.: US 2002/0083646 A1 to Deshpande, et al., published Jul. 4, 2002 (now U.S. Pat. No. 7,226,490); US 2002/0090326 A1 to Deshpande, published Jul. 11, 2002 (now U.S. Pat. No, 7,135, 154); US 2002/0090328 A1 to Deshpande, published Jul. 11, 2002 (now U.S. Pat. No. 6,824,577); US 2002/0090327 A1 to Deshpande, published Jul. 11, 2002 (now U.S. Pat. No. 6,887, 285); US 2002/0088740 A1 to Krause, et al., published Jul.

11, 2002(now U.S. Pat. No. 7,022,149); US 2002/0094310 A1, to Krause, et al., published Jul. 18, 2002; US 2002/0155329 A1 to Stevens, published Oct. 24, 2002(now U.S. Pat. No. 6,682,838); US 2003/00211741 A1 to Childress, et al., published Jan. 30, 2003(now U.S. Pat. No. 6,643,201); and US 2003/0021742 to Krause, et al., published Jan. 30, 2003(now U.S. Pat. No. 7,160,340 the disclosure of each of which is incorporated herein by reference. These publications disclose a number of differently configured fuel processors that may be used to advantage within the integrated apparatus of the present invention.

Fuel Processor Enclosure

Suitable enclosures for use in the methods and apparatus of the present invention may be any enclosure that is of a size, material and construction that will house the fuel processor and its associated subsystems and provide a gas impermeable seal that will prevent gases from escaping to the external environment. Preferred enclosures are rigid framed housings having panels secured to the frame. The panels may be manufactured of a variety of materials such as metals, plastics and composites with or without thermal insulation. Optionally, the panels may be removable for ease of access to the enclosure contents when the fuel processor is not in operation. Regardless of the materials or method of construction, the fully assembled enclosure should provide a gas impermeable barrier, or a barrier that will substantially inhibit the passage of gases from the interior of the enclosure.

The enclosure has connections or inlets for connecting with sources of water and fuel and for drawing air into the enclosure for use in the fuel processing operation. Preferably, the fuel will be natural gas because of its cost and ready availability. The air inlet may be connected to an external air handling system but is preferably a source of air that is directed into an air handling system housed within the enclosure. In a preferred embodiment, the air inlet is merely an air intake for an internal air handling system. The fuel and water connections are preferably conventional and standard for water and fuel sources that are typically available in residential and commercial buildings. Additional connections, inlets and/or outlets on the enclosure can include a drain connection for connecting the collection vessel with a domestic drain and a connection to an external power source.

Optionally, the enclosure has connections for connecting with a fuel cell stack. Preferably, these fuel cell stack connections provide for the delivery of a hydrogen-rich reformate and the return of anode and cathode exhaust streams to the enclosure. Where the enclosure houses an air handling system, it is envisioned that the enclosure will have a connection for delivering an air stream to the fuel cell stack. Similarly, where the enclosure has a cooling system that includes a cooling medium, such as water or the like, it is further envisioned that the enclosure will have connections for delivering the cooling medium to the fuel cell stack to aid in regulating the temperature within the stack. Any connections with the fuel cell stack are preferably conventional and standard in nature to simplify the use of the fuel processor and its enclosure with any fuel cell stack. In addition, it is preferred that all of the enclosure connections, inlets and outlets, be "quick-connect" in nature to further simplify the installation of the fuel processor.

Those skilled in the art should be able to select the size and shape of the enclosure appropriate for the fuel processor and the desired subsystems. However, it is preferred that the enclosure is a cabinet that is not so large that it cannot easily be transported from one location to another. Likewise, the materials used should provide the gas impermeable barrier described above, but should not be so bulky as to inhibit transportation. Thus, it is preferred that the enclosure have wheels or other means for moving the enclosure.

Collection Vessel

A collection vessel is used in the methods and apparatus of the present invention to provide a common container for receiving a plurality of waste water streams and providing a volume within which combustible gases that may be dissolved or entrained in the collected water can evaporate before the water is disposed. Because most waste water streams entering the collection vessel are at elevated temperatures, it is envisioned that no additional heat will be needed to facilitate the evaporation of gases from the collected water. In addition, the separation of gases entrained in the waste water will occur naturally as a function of physics. Gases are typically less dense than liquids and will naturally separate from the higher density water. The degassed waste water in the collection vessel will pass through the collection vessel outlet and through a drain line to the domestic drain/sewer.

Collection vessels suitable for use in the methods and apparatus of the present invention are those vessels that can be used to receive and collect water originating from a number of different sources both within and without the enclosure. The collection vessel will have a plurality of inlets for receiving water from these sources and an outlet connected with a drain line leading to a domestic drain. In a preferred embodiment, the collection vessel has an enlarged opening at its top through which it can receive waste water streams from a plurality of sources. Such a collection vessel is not unlike a drain pan, and is sometimes referred to herein as an "open vessel." As noted, the collection vessel should be capable of receiving water from a plurality of different sources. As described herein, such sources will include sources internal to the fuel processor system such as condensate separated from the hydrogen-rich reformate stream and overflow from a process water tank, and sources external to the enclosure such as exhaust streams from a fuel cell stack. All of these various sources have the potential to contain entrained or dissolved combustible gases in the stream. Therefore, before the water can be safely disposed the combustible gases must be eliminated or reduced to a safe level.

Where the collection vessel is closed having a plurality of inlets for receiving waste water streams, the collection vessel will have a gas outlet through which gases accumulating within the collection vessel may be evacuated. In such an embodiment, the evacuated gases are preferably routed to a combustor for combusting. Preferably however, the collection vessel will be an open vessel that is open to the interior of the enclosure so that the combustible gases will evaporate into the interior of the enclosure. In such an embodiment, a detection system (described below) is preferably used to monitor the interior of the enclosure for the presence of combustible gases.

The size of the collection vessel will depend upon the volume of waste water that is to be treated in this manner as well as the amount of combustible gases that are to be removed. The collection vessel is located in the lower portion of the enclosure and is preferably affixed to the floor of the enclosure.

Separator

As noted above, a common source of waste water from within the fuel processor is condensate that has been removed directly from the hydrogen-rich reformate stream. Water is typically added during a number of different stages in the fuel reforming process such as prior to or during the fuel reforming reaction, as a means for cooling the reformate, and prior to or during a shift reaction amongst others. Generally, at least of portion of this water needs to be removed so that it does not interfere with the operation of the fuel cell stack. Likewise, fuel cell exhaust typically contains product water vapor, and liquid product water that need to be separated before exhaust gases can be combusted. Therefore, depending on the source of water to be disposed, a separator can be used in the methods and apparatus of the present invention to separate waste water from a fuel processing stream and/or a fuel cell exhaust stream.

Suitable separators include those known in the art for separating liquids from a gas stream, such as those disclosed in U.S. Patent Application Publication No. 2002/0044670, "Method and Apparatus for Collecting Condensate From Combustible Gas Streams in an Integrated Fuel Cell System", published Mar. 6, 2003 (now U.S. Pat. No. 6,560,346); U.S. Pat. No. 5,643,470, "Centrifugal Flow Separator Method", issued Jul. 1, 1997; and U.S. Pat. No. 6,485,854, "Gas-Liquid Separator for Fuel Cell System", issued Nov. 26, 2002, which are incorporated herein by reference. Other devices that are known in the art for separating liquids from gases can also be used to separate water from these gas streams.

It is preferred that the separator be a centrifugal-type water separator such as is disclosed in U.S. patent application Ser. No. 10/408,035, "Method and Apparatus for Separating Liquid From a Gas Stream", Wheat, et al., filed Apr. 4, 2003 the description of which is incorporated herein by reference.

Ventilator

Typical operation of the fuel processor and enclosure does not expect combustibles to be present in the drain pan as such gases should be separated from the water within the water separator unit. However, in the event of a failure inside the water separator the gases dissolved or entrained within the water pass through the separator and into the collection vessel. Potentially, a high pressure spike could push all the water out of the separator creating a path for gases to escape the separator into the enclosure. Therefore, in an optional but highly preferred embodiment of the present invention, the apparatus will include a ventilator for evacuating gases from the enclosure.

The ventilator may be a simple fan oriented to draw gases from within the enclosure and vent them to outside the enclosure. Such an operation is safe and effective where little or no combustible gases are detected within the enclosure. In the event combustible gases are so detected, the ventilator should have the capability to re-direct the combustible gases to a combustor within the enclosure for combustion before venting can occur.

Further, in an integrated system, it is preferred that the ventilator be an element within the fuel processor coolant system. Such a system will comprise one or more heat exchangers and one or more fans for providing a cooling medium to a number of the fuel processor and potentially the fuel cell stack functions. Such a coolant system and its use in ventilating a fuel processor enclosure are described in greater detail in U.S. patent application Ser. No. 10/407,401, "Coolant System for Fuel Processor", Wheat, et al., filed Apr. 4, 2003 the description of which is incorporated herein by reference.

Combustor

Fuel processors and reformers typically have an associated combustor that is either separate from or integrated with the reforming reactor and that is used to heat reactants, generate steam, heat reactors, and dispose of undesirable by-products that are generated during the operation of the fuel processor and/or fuel cell. For instance, such combustors are frequently referred to as anode tail gas oxidizers since they are commonly used to combust tail gas from the anode of the fuel cell stack in addition to their role in the fuel processing operation.

In the methods and apparatus of the present invention it is preferred that a combustor be present to aid in the fuel processing operation and to combust gases separated from reformate and fuel cell exhaust streams. In the typical operation, gases that have evaporated from water within the collection vessel to the interior of the enclosure will contain very low levels of combustibles and can be safely vented from the enclosure without additional processing or treatment. However, in the event that high levels of combustible gases are detected in the enclosure, such as after a failure of a water separator, it is envisioned that the fuel processor combustor can be used for combusting and thereby eliminating those combustible gases. After combustion, the combustion exhaust gases can typically be vented safely from the enclosure.

Suitable combustors can include those disclosed in U.S. Pat. No. 6,077,620, issued Jun. 20, 2000 to Pettit (catalytic combustor fired by anode effluent and/or fuel from a liquid fuel supply that has been vaporized); U.S. Pat. No. 6,232,005, issued May 15, 2001 to Pettit (a tubular section at the combustor's input end intimately mixes the anode and cathode effluents before they contact the combustors primary catalyst bed; the tubular section comprises at least one porous bed of mixing media that provides a tortuous path for creating turbulent flow and intimate mixing of the anode and cathode effluents therein); and U.S. Pat. No. 6.342,197, issued Jan. 29, 2002 to Senetar, et al. (describing and comparing combustors with a variety of features and configurations), the disclosure of which is incorporated herein by reference.

Other suitable combustors include those described in U.S. patent application Ser. No. 10/408,080, "Method and Apparatus for Rapid Heating of Fuel Reforming Reactants" to Nguyen, filed Apr. 4, 2003 now U.S. Pat. No. 7,235,217), and in U.S. patent application Ser. No. 10/407,290, "Anode Tailgas Oxidizer" to Deshpande, et al., filed Apr. 4, 2003 now U.S. Pat. No. 7,101,175).

Gas Detection System

The methods and apparatus of the present invention optionally, but preferably, include a gas detection system for monitoring the interior of the enclosure for the presence of combustible gases. Such a detection system has at least one gas sensor for monitoring the environment within the enclosure and communicating data to a processor or process controller. The sensor is preferably a lower explosive threshold limit-type sensor. The sensor should be selected based upon a number of factors including the nature and associated hazards of the gases that may be present within the enclosure, as well as applicable codes and standards for the locale where the fuel processor is to be installed and operated. Suitable sensors are commercially available from a multitude of vendors and are typically sold as carbon monoxide, natural gas and hydrogen sensors. Further, separate sensors for each gas are not required. Due to the nature of carbon monoxide and natural gas, a gas detection sensor designed to detect natural gas or carbon monoxide will also be triggered by the presence of hydrogen at levels $1/10^{th}$ the lower explosive limit of the sensor.

The process controller receives data from the gas sensor. It is envisioned that the process controller is also used to control the operation of the fuel processor and its subsystems. Depending on the data received from the sensor, the process controller can activate an alarm to alert an operator, begin a shut-down sequence for the fuel processor, and/or activate an evacuator that will remove the gases from the interior of the enclosure among other possible routines.

Fuel Cell Connections

The methods and apparatus of the present invention preferably have connections for receiving anode and cathode exhaust streams from the fuel cell or from the anode and cathode manifolds of a fuel cell stack. Further, the enclosure should have a connection or outlet for connecting with the fuel cell for delivering a hydrogen-rich reformate. Such gas delivery and return from a fuel cell are typically rich in liquid water. One of the major by-products of producing electricity inside the fuel cell is liquid product water. Through above mentioned water separation techniques, it is desirable to discharge some of the product water to domestic drain while retaining other for use in the system operation.

In addition, fuel cells and fuel cell stacks may circulate a cooling medium through the stack to control the temperature of the stack. As such the apparatus of the present invention can include a connection for connecting a coolant system within the enclosure to the fuel cell stack for delivering and returning a circulating cooling medium.

Process Water Tank

It is preferred that the fuel processing apparatus of the present invention and the related methods further have a process water tank or reservoir. As described herein, a source of process water is required at a number of different stages throughout the fuel processing operation. Further, cathode exhaust from the fuel cell contains liquid water and water vapor that may be condensed and recycled for use in the fuel processor. An outlet or overflow can be used in process water tank to prevent the level from exceeding a desired level. Because this process water may contain volatile and/or combustible gases, any overflow or water withdrawn from the process water tank is directed to the collection vessel for degassing therein.

Containers and vessels for use as a process water tank are well known in the art. However, methods and systems for managing water within a fuel processor and/or integrated fuel processor and fuel cell system are disclosed in U.S. patent application Ser. No. 10/407,617, "Method and Apparatus for Separating Water From a Fuel Cell Exhaust Stream", Deshpande, et al., filed Apr. 4, 2003, and U.S. patent application Ser. No. 10/408,006, "Method and Apparatus for Level Control in a Water Tank of a Fuel Cell Reformer," Wheat, et al., filed Apr. 4, 2003 now U.S Pat. No. 7,028,700).

(2) A Method for Separating Water From a Reformate Stream for Safe Disposal

The present disclosure also encompasses a method for separating water from a reformate stream for safe disposal. The method comprises the steps of operating a fuel processor within a gas impermeable enclosure to produce a hydrogen-rich reformate including water and at least one combustible gas component, separating the water from the hydrogen-rich reformate and directing the water to an open collection vessel within the enclosure, and evaporating an entrained combustible gas component(s) from the water to the interior of the enclosure. Optionally, but highly preferred, this method further includes the step of directing the water out of the collection vessel to a drain. The method can also include the step of combusting the water-depleted hydrogen-rich reformate. The method can further include a step of detecting the presence of a combustible gas component within the interior of the enclosure and generating a signal when a combustible gas component is detected. Further, the method can include the step of evacuating a combustible gas component from the interior of the enclosure. In addition, the method can include the steps of receiving from a fuel cell a fuel cell exhaust mixture that contains an exhaust gas and product water. Such a method would preferably include the steps of separating the product water from the exhaust gas, directing the product water to the open collection vessel and combusting the separated exhaust gas. The present method can further include the step of withdrawing process water from a process water tank and directing the withdrawn process water to the open collection vessel for disposal.

(3) A Method for Manufacturing an Apparatus for Separating Water From a Reformate Stream for Safe Disposal Another illustrative method of the present invention is a method for manufacturing an apparatus for separating water from a reformate stream for safe disposal. The method comprises the steps of enclosing a fuel processor, which will be used to produce a hydrogen-rich reformate comprising water and at least one combustible gas component, in a gas impermeable enclosure, providing a separator for separating the water from the hydrogen-rich reformate, providing an open collection vessel within the gas impermeable enclosure for receiving separated water from the separator, and providing the collection vessel with a drain connection. Optionally, but preferably, the method will also include the step of providing a gas detection sensor in the enclosure for detecting the presence of a combustible gas component within the interior of the enclosure. Further, the method can include the step of providing a connection to a fuel cell for receiving fuel cell exhaust that contains water and a fuel cell exhaust gas from a fuel cell.

DETAILED DESCRIPTION OF THE FIGURES

FIG. 1 is a simplified block diagram of an integrated apparatus and enclosure of the present invention. The integrated apparatus is shown generally by reference number 10. The integrated apparatus and enclosure has reformer 15 that is housed within gas impermeable enclosure 5. Enclosure 5 encloses a number of fuel processor subsystems including the reformer, separator 20, combustor 25 and collection vessel 40, as well interior 55 which constitutes the open volume or open space within enclosure 5.

Enclosure 5 has a number of connections or inlets and outlets for connecting the reformer and other fuel processing subsystems with external elements. Connection 24 is provided on enclosure 5 for connecting the reformer with external hydrocarbon fuel source 4. Connection 22 is provided for connecting the reformer or an internal process water tank (not shown in FIG. 1) with external process water source 2. Connection 28 is provided for connecting with an external fuel cell or fuel cell stack and for directing hydrogen-rich reformate to the fuel cell therethrough. Connection 34 is provided for directing combustion products from combustor 25 our of enclosure 5. Connection 36 is provided for connecting the collection vessel outlet to an external drain line. Connection 36 may simply be an outlet for directing collected, degassed water out of enclosure 5 so that it may drain into a simple floor drain.

Reformer 15 receives water and a hydrocarbon-based fuel from external sources and converts the fuel into a hydrogen-rich reformate. Reformate 8 is directed to one or more stages illustrated collectively as clean-up/shift 45. The purified shifted reformate 3 is then directed to separator 20 for separating and removing at least a portion of the water that is present in the reformate gas stream. Preferably, the reformate will be cooled so as to condense the water from the reformate before being separated from the reformate gas stream. If the water-depleted reformate is of fuel cell quality, the reformate gas is directed through line 12 out connection 28 and to fuel cell stack 30 where it will be at least partially consumed by the fuel cell. If the water-depleted reformate is not of fuel cell quality, the reformate gas is directed through line 14 to combustor 25 for combustion. The combustion product gases can then be directed out of enclosure 5 through line 16. Connection 34 is provided and may be used to connect the combustor exhaust line with external vent 35.

Water separated from the reformate gas in separator 20 is directed through line 18 into collection vessel 40. The separated water will commonly contain entrained or dissolved combustible gas components that can evaporate from the water while in collection vessel 40. As illustrated, collection vessel 40 is an open vessel such that vaporized gases escaping from the collected water will diffuse into interior space 55 within the enclosure. After the collected water has had sufficient time to be degassed in collection vessel 40, the water exits through outlet 32 to line 26 and out of the enclosure through connection 36. Water may be held in collection vessel 40 for periodic draining or a restriction may be used in outlet 32 to maintain a gradual flow of water out of the vessel. Connection 36 is connected with domestic drain 50 for safely disposing of the degassed water into the local sewer network.

Figure 2:
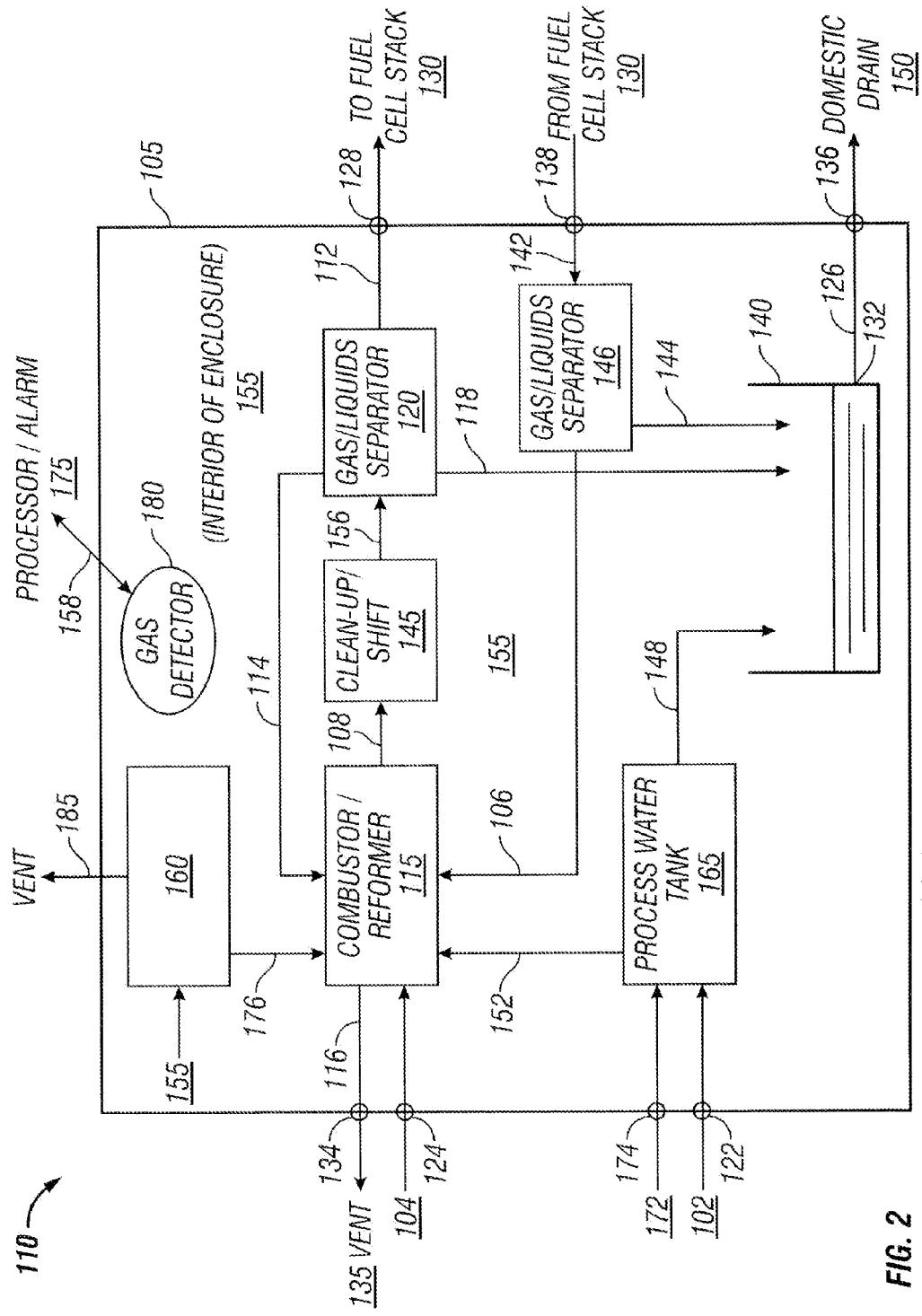
FIG. 2 is a block diagram of an integrated fuel processor apparatus and enclosure of the present invention, particularly illustrating the integration of the integrated apparatus with a fuel cell stack.

FIG. 2 is also a simplified block diagram of an integrated apparatus and enclosure of the present invention. The integrated apparatus is shown generally by reference number 110. The integrated apparatus and enclosure has a combination combustor/reformer 115 that is housed within gas impermeable enclosure 105. Enclosure 105 encloses a number of fuel processor elements including the combustor/reformer 115, separator 120, separator 146, collection vessel 140, process water tank 165 and ventilator 160, as well interior 155 which constitutes open volume or open space within enclosure 105. The integrated apparatus illustrated in FIG. 2 operates in essentially the same manner as that illustrated in FIG. 1, with the exception that the reformer and combustor are combined or integrated. In addition, the fuel processor and enclosure of FIG. 2 is integrated with an external fuel cell stack 130.

More specifically, process water from source 102 enters the enclosure through connector or inlet 122 and passes into process water tank 165. Process water tank also is illustrated as having an inlet from return line 172 which directs the cathode exhaust stream into enclosure 105 through connection 174. The cathode exhaust stream is directed into the enclosure and into process water tank 165 so that liquid product water and product water vapor from the fuel cell stack can condense out of the exhaust stream and be re-used within the fuel processor. Process water for use in the fuel processing operation is directed to the combustion/reformer through line 152. Level sensors within the process water tank (not shown) are used to control the level of process water. Should the level of process water rise above a desired level, water can be withdrawn from tank 165 through line 148 and deposited in collection vessel 140. Because the cathode exhaust stream is routed through process water tank 165, it is possible for water withdrawn through line 148 to contain combustible gases.

Hydrocarbon based fuel from an external source 104 enters the enclosure through connection 124 and is directed to combustion/reformer 115. The fuel and water (converted to steam within the combustor/reformer) are catalytically reformed within the combustion/reformer as described above. Other materials entering combustor/reformer 115 for combustion include off-specification reformate that is directed through line 114 and anode exhaust gases that are directed through line 106. Combustion product gases to be vented from the combustor/reformer and enclosure 105 are directed out through line 116 and connection 134. Connection 134 is connected with external vent 135 to vent the combustion gases outside the building containing enclosure 105.

The hydrogen-rich reformate gas stream produced by the combustor/reformer is directed through line 108 through one or modules or stages illustrated collectively as clean-up/shift 145. The purified shifted reformate is then directed via line 156 to separator 120, where water is separated from the hydrogen-rich reformate gas. The water and any entrained or dissolved combustible cases are directed to collection vessel 140 through line 118. Water-depleted reformate that is determined to be of less than fuel cell quality will be returned to the combustor/reformer for combustion through line 114. Water-depleted reformate that is of fuel cell quality is directed to an external fuel cell stack 130 through line 112 and connection 128.

The fuel cell stack consumes the hydrogen-rich reformate and an oxygen-containing gas in the electrochemical reaction that produces electricity. Spent reformate, unreacted hydrogen and spent oxygen-containing gas, unreacted oxygen, and product water in liquid and vapor phases are present in the fuel cell exhaust gas streams. As illustrated, the anode exhaust gas stream directed through connection 138 and line 142 into separator 146. Within separator 146, liquid water is separated from the gas components and directed through line 144 to collection vessel 140. The gases that are separated from the anode exhaust gas stream are directed through line 106 to the combustor/reformer 115 for combustion. As noted above, the cathode exhaust stream is directed to the process water tank 165 where liquid water and water vapor in the gas stream will condense and drop out of the stream. Although not illustrated, cathode exhaust gases may be directed from an upper portion of the process water tank to combustor/reformer 115 for combustion.

The separated water deposited in collection vessel 140 will commonly contain entrained or dissolved combustible gas components that can evaporate from the water while in collection vessel 140. As illustrated, collection vessel 140 is an open vessel such that vaporized gases escaping from the collected water will diffuse into interior space 155 within the enclosure. After the collected water has had sufficient time to be degassed in collection vessel 140, the water exits through outlet 132 and line 126 and out of the enclosure through connection 136. Water may be held in collection vessel 140 for periodic draining or a restriction may be used in outlet 132 to maintain a slow but gradual flow of water out of vessel 140. Connection 136 is connected with domestic drain 150 for safely disposing of the degassed water into the local sewer network.

Combustible gases that evaporate from the collected water diffuse out of the open collection vessel into the interior 155 of enclosure 105. Ventilator 160 constantly vents gases from the interior of the enclosure through line 185, Gases within the enclosure are monitored by gas sensor 180 which communicates data 158 with processor means 175. Processor means 175 monitors the data 158 received from sensor 180 and determines when a significant level of combustible gases are present in enclosure 105. As a response to the detection of a significant or high level of such gases, the processor may generate a signal to activate an alarm, to activate a shut-down routine for the fuel processor, or to instruct ventilator 160 to direct the gases from the enclosure to an inlet 176 to combustor/reformer 115 for combustion. In the alternative, in an embodiment not illustrated in FIG. 2, the combustible gases may be directed out of enclosure 115 for storage or handling in a separate module.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method for separating water from a reformate stream for safe disposal, the method comprising the steps of:
   operating a fuel processor within a gas impermeable enclosure to produce a hydrogen-rich reformate comprising water and at least one combustible gas component;
   separating the water from the hydrogen-rich reformate and directing the water to an open collection vessel within the enclosure; and
   evaporating an entrained combustible gas component from the water to the interior of the enclosure.

2. The method of claim 1, further comprising the step of directing the water out of the collection vessel to a drain.

3. The method of claim 1, further comprising the step of detecting the presence of a combustible gas component within the interior of the enclosure.

4. The method of claim 3, further comprising the step of generating a signal when a combustible gas component is detected.

5. The method of claim 1, further comprising the step of evacuating a combustible gas component from the interior of the enclosure.

6. The method of claim 5, further comprising the step of combusting the evacuated combustible gas component.

7. The method of claim 1, further comprising the step of combusting the water-depleted hydrogen-rich reformate.

8. The method of claim 1, further comprising the steps of receiving a fuel cell exhaust mixture comprising an exhaust gas and product water, separating the product water from the exhaust gas and directing the product water to the open collection vessel.

9. The method of claim 8, further comprising the step of combusting the separated exhaust gas.

10. The method of claim 1, further comprising the step of withdrawing process water from a process water tank and directing the withdrawn process water to the open collection vessel.

11. A method for manufacturing an apparatus for separating water from a reformate stream for safe disposal, the method comprising the steps of:
    enclosing a fuel processor in a gas impermeable enclosure, the fuel processor to produce a hydrogen-rich reformate comprising water and at least one combustible gas component
    providing a separator for separating the water from the hydrogen-rich reformate; and
    providing an open collection vessel within the enclosure for receiving separated water from the separator.

12. The method of claim 11, further comprising the step of providing a gas detection sensor in the enclosure for detecting the presence of a combustible gas component within the interior of the enclosure.

13. The method of claim 11, further comprising the step of providing a connection to a fuel cell for receiving fuel cell exhaust.

14. The method of claim 11, further comprising the step of providing the collection vessel with a drain connection.

* * * * *